Patented Jan. 23, 1951

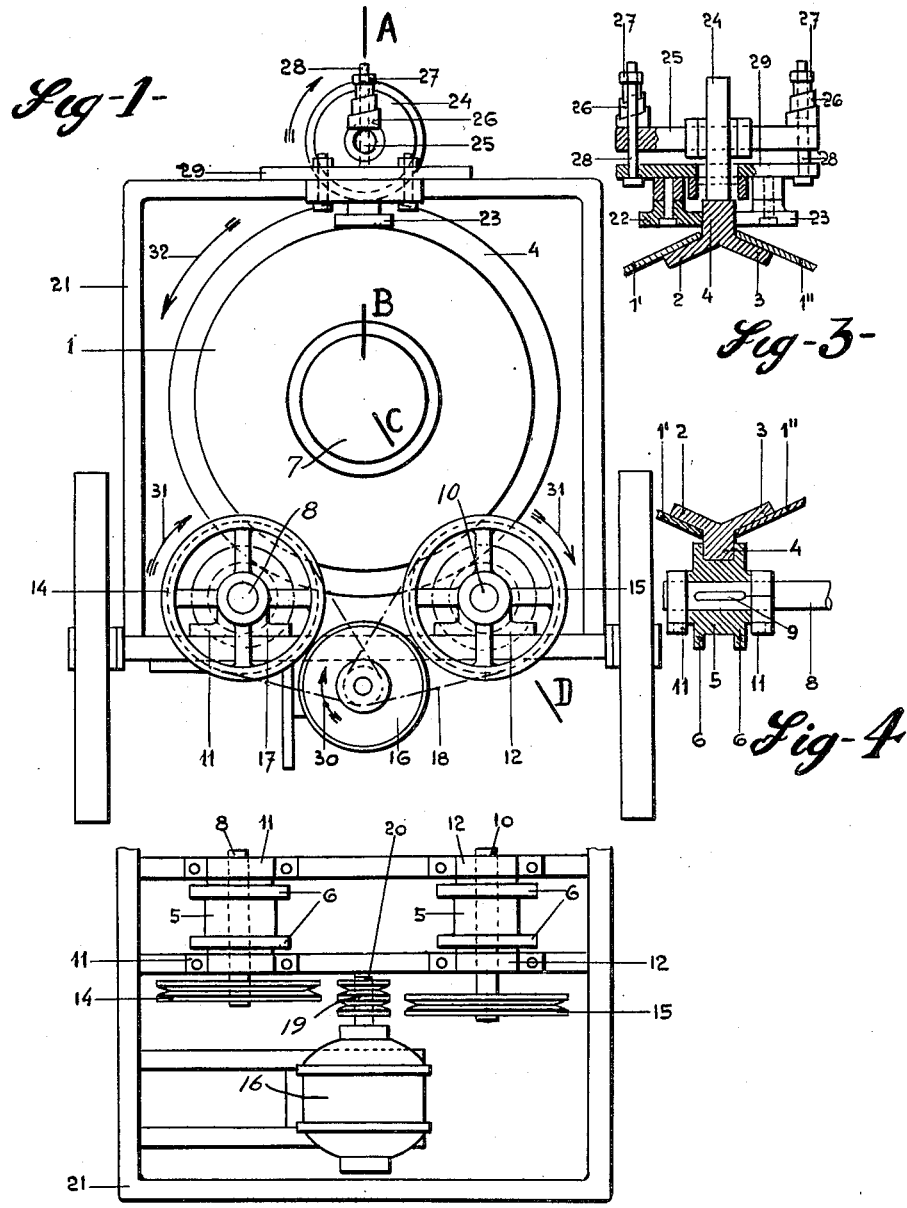

2,538,871

UNITED STATES PATENT OFFICE 2,538,871

DEVICE FOR MIXING MACHINES FOR MORTAR, CONCRETE, AND THE LIKE

Josef Jedlicka, Brno, Czechoslovakia

Application April 19, 1946, Serial No. 663,455
In Czechoslovakia October 18, 1939

Section 1, Public Law 690, August 8, 1946
Patent expires October 18, 1959

2 Claims. (Cl. 259—176)

This invention relates to a device for mixing machines for mortar, concrete and the like.

Mixing machines are already known for mortar, concrete and the like in which the mixing drum is rotated by friction by means of rollers provided on the periphery of the drum and pressed against the latter. These machines have, however, the disadvantage that all the friction rollers are disposed one behind the other on a shaft so that all the rollers in a given position of the drum impinge along a generatrix of the convex surface of the cylindrical or double cone drum whilst supporting rollers are displayed along another generatrix, which rollers are not driven from a source of power, that is to say exert no torque on the drum.

Such an arrangement has the disadvantage that the friction rollers are caused to slip with a heavy load on the machine and in consequence reduce the rotary speed of the drum. This is due to the fact that the weight of the filled mixing drum and the additional pressure exerted on the drum by the tensioning device is distributed over the friction rollers and the supporting rollers, so that only components of the forces involved act upon the friction rollers.

The object of the invention is an arrangement in which the entire weight of the filled mixing drum and the whole of the force exercised on the mixing drum by the tensioning device is utilised for producing the torque, which has to bring about the rotation of the drum.

According to the invention this is achieved by the fact that the drum of the mixing machine is carried along by friction wheels mounted symmetrically to the vertical median plane of the mixing machine and which are driven from a motor arranged between the friction wheels.

In order that the invention may be more clearly understood reference will now be made to the accompanying drawings which show by way of example an embodiment of such a drive for a mixing machine.

In the drawings:

Figure 1 is an elevation;

Figure 2 a plan view,

Figure 3 illustrates the pressing device partly in section on the line A—B of Figure 1 and by means of which the mixing drum is pressed against the friction wheels; and Figure 4 is a section on the line C—D of Figure 1, through a friction wheel and through that part of the mixing drum on which the said wheel acts.

The mixing drum 1 of the embodiment shown by way of example has the well known form of a double truncated cone. The convex surfaces 1'1'' of the conical part of the drum are secured to two flanges 2, 3 of a ring-shaped rim, 4, for example by riveting. The rim 4 is designed as a friction element and is rotated by two friction wheels 5 which are keyed by keys 9 on spindles 8, 10, the friction wheels being so arranged symmetrically to the vertical median plane of the mixer that the rim 4 is pressed against the friction wheels 5. The friction wheels are driven from the belt or rope pulleys 14, 15 keyed on the shaft 8 and which are in turn driven from a double pulley 19 having the same direction of rotation and mounted on the shaft of the electric motor 16. The friction wheels 5 are preferably so designed that they possess two flanges 6 between which is arranged the wheel 5, so that the friction affecting the drive of the mixing drum is operative both on the convex surface of the ring-shaped rim 4 and also on its lateral surfaces, whereby the frictional effect is enhanced and a reliable uniform rotation of the mixing drum ensured. Simultaneously, this device effectively prevents any axial displacement of the mixing drum.

The pressing of the mixing drum against the friction wheels is, however, not only affected by the weight of the drum itself and the weight of its charge, but is also additionally assisted by a pressing device mounted on the top of the frame 21 of the mixing machine. This device consists substantially of a pressure roller 24, the periphery of which is pressed against the convex surface of the ring-shaped rim 4. The pressing of the roller 24 is effected by a plate 29 secured to the frame 21 and through which pass two bolts 28 on which the expanded ends of the shaft 25 of the idle pressure roller 24 are threaded. In addition, slipped over the screws 28 are springs 26 which impinge against the ends of the shaft 25. These springs are tensioned as required by the nuts 27, whereby the pressing of the roller against the drum of the mixing machine and therefore an adjustable and additional pressure of the mixing drum against the mixing wheels 5 is effected.

The construction of the pressing device is, moreover, utilised to ensure an additional guiding of the mixing drum, two guide rollers 22, 23 being pivotally mounted thereon, which impinge against the lateral surfaces of the friction rim 4.

The rim is thus axially supported at three points, that is to say below by the flanges 6 of the friction wheels 5 and at its highest point by the guide rollers 22, 23 thereby ensuring particularly reliable operation.

The invention is, of course, not restricted to driving a mixing drum having the shape of a double truncated cone; on the contrary, within the scope of the invention, mixing drums of other shape, for example cylindrical, may also be driven, whereby, on each of the spindles 8, 10 a number of friction wheels are arranged one behind the other which bear against suitable friction rims and each friction rim is depressed by a pressure roller 24 and provided with two guide rollers 22, 23.

I claim:

1. In a mixer a frame, a mixing drum rotatably mounted in said frame consisting of two truncated cones and a center rim connected to the large ends of said two drum cones, friction wheels located in said frame to support and to rotate said center rim, a plate carried by said frame, bolts secured to said plate, a shaft movably carried on said bolts, a pressure roller carried by said shaft in frictional contact with said rim, threaded nuts on the ends of said bolts and springs between said shaft and said nuts to press said pressure roller against said rim.

2. In a mixer a frame, a mixing drum rotatably mounted in said frame consisting of two truncated cones and a center rim connected to the large ends of said two drum cones, friction wheels located in said frame to support and to rotate said center rim, a plate carried by said frame, bolts secured to said plate, a shaft movably carried on said bolts, a pressure roller carried by said shaft in frictional contact with said rim, threaded nuts on the ends of said bolts and springs between said shaft and said nuts to press said pressure roller against said rim and guiding rollers carried by said plate in contact with the lateral faces of said rim.

JOSEF JEDLICKA.

REFERENCES CITED

The following references are of record in the file of this patent:

UNITED STATES PATENTS

| Number | Name | Date |
|---|---|---|
| 690,783 | Smith | July 7, 1902 |
| 1,145,171 | Smith | July 6, 1915 |
| 1,867,838 | Jaeger | July 19, 1932 |
| 1,889,558 | Lee | Nov. 29, 1932 |
| 2,054,469 | Rybeck | Sept. 15, 1936 |

FOREIGN PATENTS

| Number | Country | Date |
|---|---|---|
| 308,006 | Great Britain | Mar. 21, 1929 |